United States Patent [19]
Lahoda et al.

[11] Patent Number: 5,125,951
[45] Date of Patent: Jun. 30, 1992

[54] PROCESS FOR PRODUCING A DRIED FERTILIZER FROM SEWAGE SLUDGE

[75] Inventors: Edward J. Lahoda, Edgewood Borough; Robert J. Leduc, Monroeville, both of Pa.

[73] Assignee: Westinghouse Electric Corp., Pittsburgh, Pa.

[21] Appl. No.: 309,746

[22] Filed: Feb. 13, 1989

[51] Int. Cl.$^5$ .............. C05F 7/00; C05G 3/00
[52] U.S. Cl. .......................... 71/12; 71/13; 71/62; 71/63; 71/64.05; 71/904; 210/711
[58] Field of Search ............ 71/12-14, 71/63, 901, 903, 64.05; 210/711, 625

[56] References Cited

U.S. PATENT DOCUMENTS

| | | | |
|---|---|---|---|
| 260,165 | 6/1882 | Collett | 71/12 |
| 1,668,464 | 5/1928 | Pease | 71/24 |
| 3,835,021 | 9/1974 | Lorenz et al. | 71/12 X |
| 4,012,320 | 3/1977 | Conner et al. | 210/711 |
| 4,038,180 | 7/1977 | Talbert | 210/711 |
| 4,076,515 | 2/1978 | Rickard | 71/10 |
| 4,078,094 | 3/1978 | Katzen | 71/12 X |
| 4,174,371 | 11/1979 | Bell et al. | 71/12 X |
| 4,185,680 | 1/1980 | Lawson | 71/12 X |
| 4,743,287 | 5/1988 | Robinson | 71/12 |
| 4,793,927 | 12/1988 | Meehan et al. | 71/901 |

FOREIGN PATENT DOCUMENTS 0141519 5/1980 Fed. Rep. of Germany .......... 71/63

Primary Examiner—Ferris Lander
Attorney, Agent, or Firm—Daniel P. Cillo

[57] ABSTRACT

Sewage sludge is subjected to a treatment with an acid in order to form stable ammonium compounds before thermal drying of the sludge which would otherwise volatilize ammonia and diminish the nitrogen content of the sludge.

7 Claims, 1 Drawing Sheet

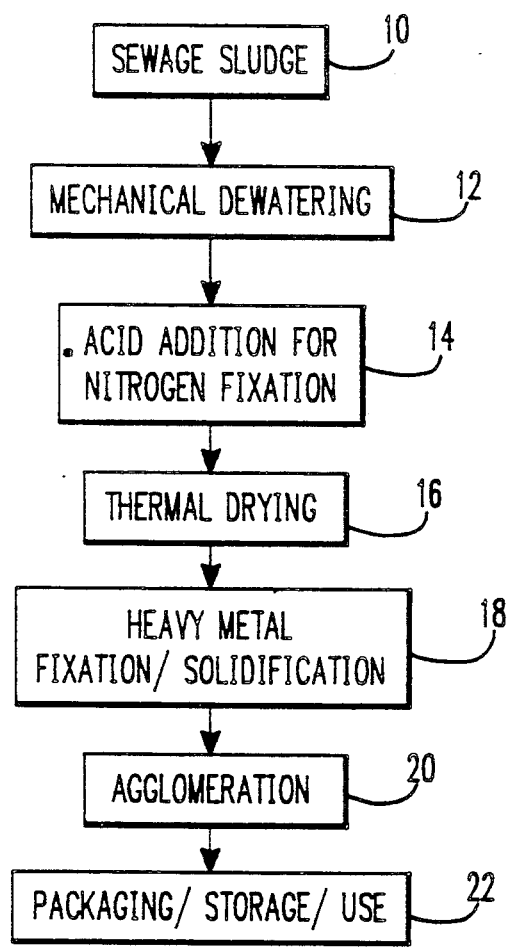

PROCESS FOR PRODUCING A DRIED FERTILIZER FROM SEWAGE SLUDGE

This invention relates to the production of fertilizer from materials such as sewage sludge and particularly to a process for fertilizer production involving nitrogen fixation prior to thermal removal of water from the sludge material.

BACKGROUND AND SUMMARY OF THE PRESENT INVENTION

Municipal sewage sludge is currently disposed of by dumping into a landfill or the ocean or by incinerating it. Land-filling has become more expensive as dump sites close to urban centers are filled to their capacity. In addition, some sewage sludges contain enough heavy metals to render them hazardous wastes, although sewage sludge is specifically exempted from certain current regulations regarding wastes with heavy metals. Ocean dumping is increasingly considered ecologically unsound and subject to regulation or prohibition. Incineration is expensive due to fuel consumption and also produces an ash product which is itself hazardous and includes even higher concentrations of heavy metals.

In addition to outright disposal, consideration has been given to the use of sewage sludge to produce a useful product such as fertilizer. One such product that has been in use for many years is produced by drying the sludge and merely using the dried sludge as fertilizer without further treatment. An example of this type of fertilizer product is that known as Milorganite, a trademark of Metropolitan Sewerage District of the County of Milwaukee. For efficient drying, temperatures of at least about 70° C. to 100° C. are employed, significantly reducing the available nitrogen in the material.

Sewage sludge, as collected and without treatment, includes, principally water with a minor amount of solids containing nitrogen compounds. The solids include human or animal waste containing ammonia; other nitrogen-containing material may also be included. In a typical municipal sewage sludge (raw settled sludge), untreated, the amount of water is typically about 95%, by weight. Of the solids contained in the sludge there is an amount of available nitrogen, primarily present as ammonia, typically of about 2% to 5%, by weight, of the weight of the solids, before drying. After drying, at temperatures of at least about 100° C., the sludge contains a much higher solids content, of course, but the available nitrogen content has been substantially reduced. This reduction in nitrogen is primarily due to the thermal decomposition of ammonia and the evolution of nitrogen and $NO_x$.

The disadvantages of the conventional process for converting sewage sludge to fertilizer include:

A low nitrogen content of the product;

High cost for the drying process in relation to the low nitrogen content of the product;

A product required to be used in large volume for effective fertilizing with attendant costs of transport;

A product in which heavy metal concentrations may be high.

By way of further background, copending application Ser. No. 07/209,675, filed Jun. 21, 1988, by C. W. Mallory and assigned to the present assignee, deals with a method of treating dewatered wastes, such as sewage sludge, in order to render such wastes environmentally acceptable for ultimate disposal. The method of the copending application involves drying the waste, converting the dried waste to granular solids through agglomeration, and adding alkaline metal silicate and a solidification agent such as cement to produce a product in granular form in which metals and other toxic materials have become chemically fixed.

The purposes of the invention include providing a method for avoiding loss of available nitrogen in the drying of sewage sludge while producing a dried product suitable for agricultural fertilizer use. An additional object is to provide an improved process for sewage sludge disposition that alleviates former economic disadvantages and environmental concerns.

In accordance with the present invention a process is carried out in which a starting material, such as municipal sewage sludge, is used which includes principally water with a minor amount of solids containing nitrogen compounds. The starting material is treated before exposure to elevated temperatures by adding an amount of an acid sufficient to produce a pH in the treated material of about 7 or less. Then water is thermally removed from the treated material.

The acid treatment places the nitrogen containing ammonia of the sludge into thermally stable compounds. For example, using nitric acid or phosphoric acid, ammonium nitrate or diammonium phosphate, respectively, are produced. The amount of acid required is not expensive and thermal drying temperatures of at least about 100° C., in excess of the boiling point of ammonium hydroxide in which the unfixed ammonia tends to occur, can be employed for drying and still yield a dried product usable as a fertilizer with a nitrogen content containing about 5% nitrogen as ammonia.

Other aspects of the invention will become more apparent from the ensuing description.

BRIEF DESCRIPTION OF THE DRAWING

The single figure is a flow chart illustrating a process for producing a dry, environmentally safe, fertilizer from sewage sludge in accordance with an embodiment of the present invention.

DESCRIPTION OF THE PREFERRED EMBODIMENTS

Referring to the drawing, block 10 represents the starting material of the process, which is municipal sewage sludge, or other similar material, including, principally water with a minor amount of solids containing nitrogen compounds. Such solids may include human or animal waste containing ammonia.

In typical sewage sludge which is principally water, the solids are typically about 5% by weight and the solids themselves contain approximately 2% to 5% by weight nitrogen occurring principally as ammonia.

Mechanical dewatering, represented by block 12, may be performed if desired to remove some of the water. Techniques such as centrifuging or decanting may be used producing a solids concentration of about 20% to 30% by weight, for example.

To the starting material, after dewatering, if any, and before any thermal drying at elevated temperatures (such as about 70° C. or more) occurs, there is added a quantity of an acid for nitrogen fixation, represented by block 14. The acid may be nitric acid, phosphoric acid, or mixtures thereof, to produce a pH of about 7 or below. Addition of such an acid converts the ammonia to ammonium nitrate, in the case of nitric acid, or to one or more of the three forms of ammonium phosphates, depending on the final pH of the treated material. These compounds do not volatilize until temperatures well above 100° C. are reached. This compares to the boiling point for ammonium hydroxide of about 70° C. to about 100° C.

Either nitric acid or phosphoric acid, or a mixture thereof, is preferred because each contributes soil nutrients to the ultimate fertilizer. Each is also reasonably economical. In general, however, any acid will perform the desired nitrogen fixation. Halide acids are normally not suitable for fertilizer production because the salts produced are undesirable. Sulfuric acid can be used if desired to produce a fertilizer product that also helps make soil porous and granular.

Only after the acid addition is the sludge subjected to thermal drying, represented by block 16. The drying process normally reaches about 100° C. or more and ammonium would tend to be removed but for the acid treatment described. The ammonium nitrate or phosphate will stay and therefore substantially all of the nitrogen of the original sludge remains and is available in the finished product after the drying operation. Drying may be performed in a rotary dryer and result in drying to an increased solids concentration of, for example, in the range from about 70% to about 90%, by weight. About 80% by weight is a more specific example.

The cost of the acid treatment is reasonable compared with the commercial value of the resulting product. Present information indicates that the added acid is likely to cost roughly the same as the commercial value of the treated and dried sludge. Without the acid treatment, the available nitrogen would decrease to such a low level the dried sludge may be without appreciable commercial value. The significant economic difference is that now the dried sludge can be used as a fertilizer instead of representing a disposal problem.

Therefore, summarizing these aspects of the invention, the process of the invention adds an acid to sewage sludge to fix the available nitrogen in a form which will not volatilize at elevated sludge drying temperatures.

Preferably in accordance with the present invention the sewage sludge is first dewatered, such as by mechanical treatment including centrifuging and then subjected to the acid treatment. The centrifuging may be performed to achieve a solids concentration in the range from about 20% to about 30%, by weight.

The use of an acid such as nitric acid or phosphoric acid is economical and stabilizes the ammonia during the drying of the sewage sludge to compounds that will remain after drying. Additionally, the stabilization of the ammonia reduces ammonia odors otherwise evolving during the drying operation.

The acid addition is performed as aforesaid to achieve a pH of between about 6 and 7 if the intent is to economize on the use of acid. However, increasing acidification to lower pH levels is also suitable and may be desirable to enhance the final fertilizer nutrient values.

Thermally dried sludge at this point is, in accordance with the above-mentioned copending application Ser. No. 07/209,675, treated by the addition of heavy metal ion fixation agents, represented by block 18, if desired. The description of the copending application is incorporated by reference herein. The fixation or solidification agents, typically including cement and sodium silicate, place the heavy metals into stable compounds in which they will not dissolve out and result in a hazard to the soil or ground water in which the dried sludge is applied.

An additional benefit of the heavy metal fixation treatment is to raise the pH of the material, such as to about 10 or more, which is favorable for agricultural use.

After, or during, the heavy metal fixation treatment, agglomeration of the sludge into soil nutrient pellets is performed as represented by block 20. The pellets may then be treated as a commodity. For example, they may be bagged as a product for retail sales or used by direct loading for bulk sales. In either form they can be safely stored for a considerable period of time. They may be ultimately used in agriculture or by highway departments and land developers for soil improvement.

The following table, by way of further example, presents certain representative process parameters of a typical process to be performed in accordance with the present invention and the above description:

| APPROXIMATE PROCESS PARAMETERS (ALL % BY WEIGHT) | |
|---|---|
| Centrifuge Dewatering | |
| Solids Concentration After Dewatering | 4 percent |
| Free N Content Before Addition and After Dewatering | 5 percent (dry basis) |
| Acid Addition | |
| Amount of Acid (H₃PO₄ sufficient to fix all ammonia, plus 5%) | 88 lbs./T. dewatered sludge |
| Solids plus acid | 27% |
| Thermal Drying at 100° C. | |
| Outlet Solids Concentration | 70 percent |
| Heavy Metal Fixation and Agglomeration | |
| Cement Addition | 5 percent (of wet sludge) |
| Silicate Addition (50% aqueous) | 1 percent |
| Free N Content after Agglomeration | 3.9 percent (dry basis) |

It will be understood, however, that considerable variation may be performed while retaining the significant aspects of the present invention.

In an actual specific example comparing, for a given sample material, the practive of the invention to the same process without acid treatment for N fixation, it was found:

| I. Untreated, thermally dried sludge | 21% of original ammonia was retained |
|---|---|
| II. Treated (H₃PO₄), thermally dried sludge | 68% of original ammonia was retained |

It is therefore seen that the invention produces a markedly improved product, in terms of its available nitrogen content, by retaining more ammonia by a factor of more than three.

It will be understood the principles of the invention may be practiced in other forms than the specific embodiments herein.

We claim:

1. A process, for producing a dried material suitable for use as fertilizer, consisting essentially of
(A) obtaining a starting sewage sludge including principally water and a minor amount of solids containing nitrogen as ammonia; and then
(B) mechanically dewatering the material to provide a sludge having about 20% to about 30%, by weight, solids; and then (C) adding to the dewatered sludge, before its exposure to any temperature as high as about 70° C., an amount of acid selected from the group consisting of nitric acid, phosphoric acid, and mixtures thereof, sufficient to produce a treated material with a pH of about 7 or less, comprising fixed nitrogen in thermally stable compounds which do not volatilize until temperatures over 100° C. are reached selected from the group consisting of ammonium nitrates, ammonium phosphates, and mixtures thereof; and then (D) thermally drying at temperatures up to about 100° C. to remove water from the treated material, to produce a thermally dried material with a solid concentration of about 70% to about 90%, by weight, where substantially all of the nitrogen of the original sludge remains.

2. The process in accordance with claim 1, wherein ammonia in step (A) is in the form of ammonium hydroxide which has a boiling point of from about 70° C. to about 100° C.

3. The process in accordance with claim 1, wherein the thermally dried sludge produced in step (D) has a nitrogen content containing up to about 5% nitrogen as ammonia, and heating in step (D) is from about 70° C. to about 100° C.

4. A process in accordance with claim 1 further comprising:
following thermally removing water, treating the thermally dried sludge by an addition of heavy metal ion fixation agents.

5. A process in accordance with claim 4 wherein:
the heavy metal ion fixation agents include a cement and a sodium silicate.

6. A process in accordance with claim 4 further comprising:
producing agglomerated soil nutrient pellets from the heated sludge.

7. A process in accordance with claim 6 wherein:
the producing of agglomerated soil nutrient pellets is performed simultaneously with the treating by the addition of heavy metal ion fixation agents.

* * * * *